LIQUID DISPENSING APPARATUS FOR SMALL QUANTITIES
Filed May 8, 1961 2 Sheets-Sheet 1
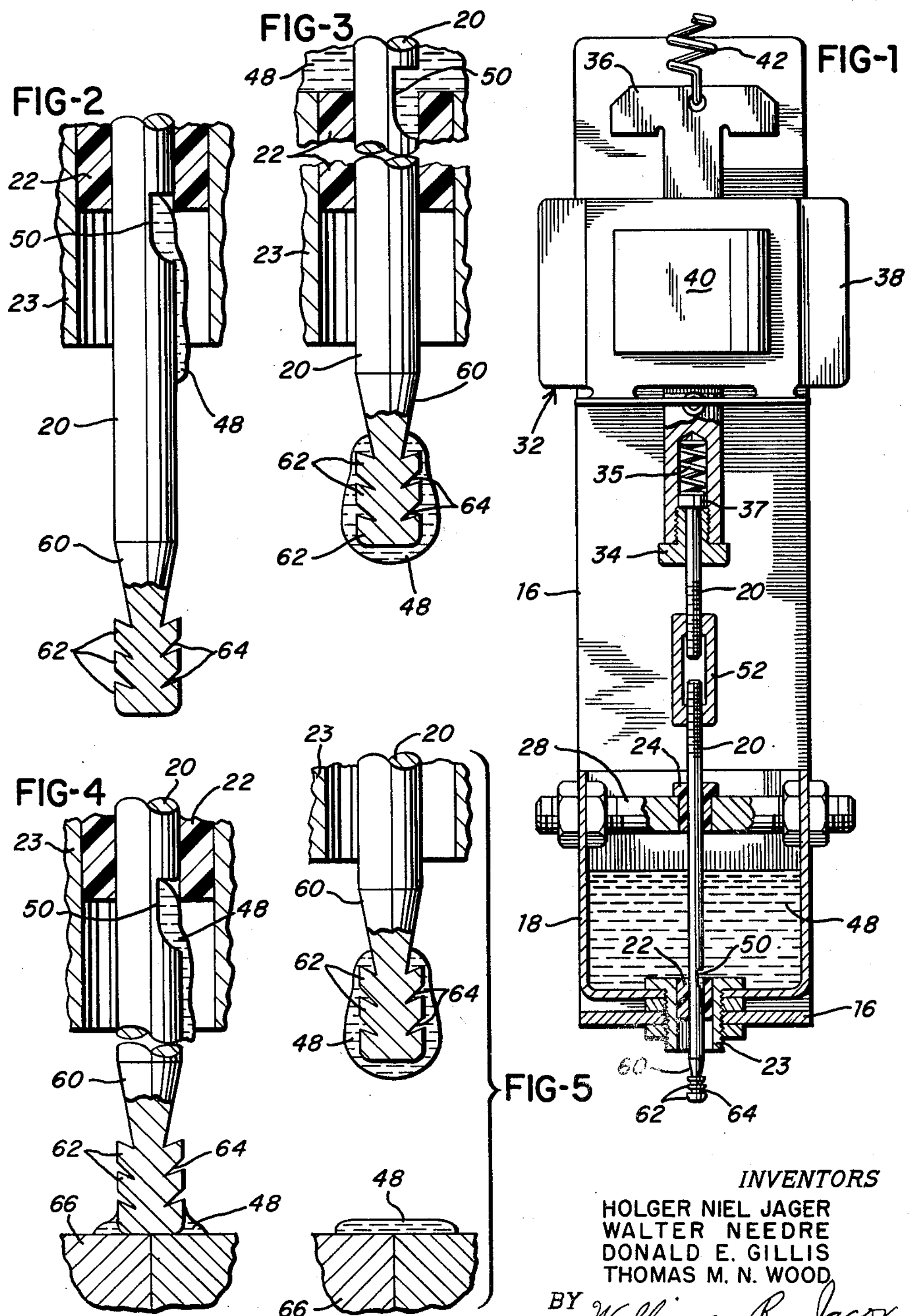
INVENTORS
HOLGER NIEL JAGER
WALTER NEEDRE
DONALD E. GILLIS
THOMAS M. N. WOOD
BY William R Jacox
ATTORNEY LIQUID DISPENSING APPARATUS FOR SMALL QUANTITIES
Filed May 8, 1961 2 Sheets-Sheet 2
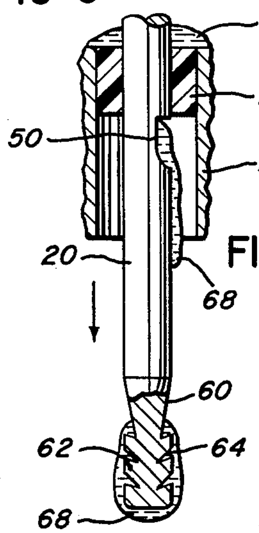
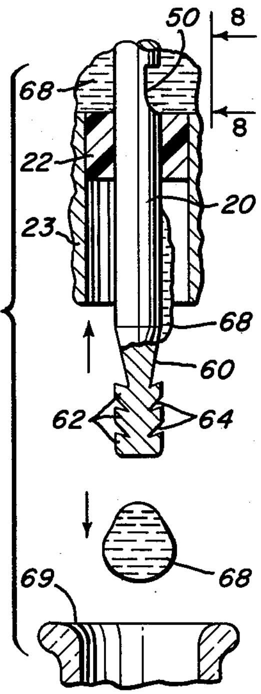
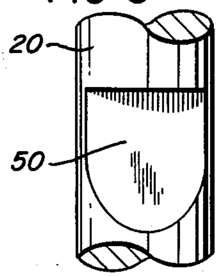
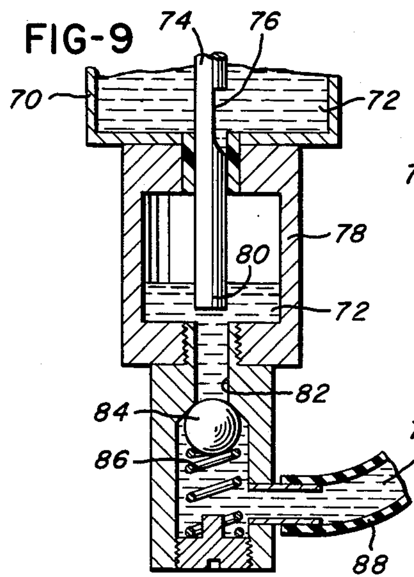
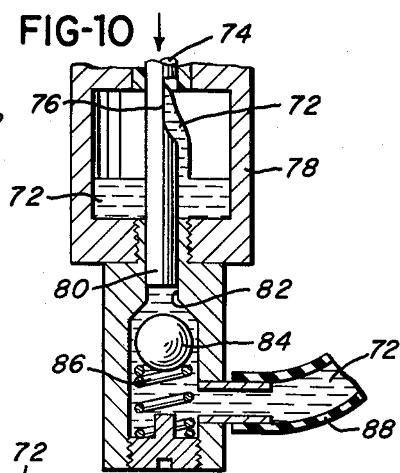
INVENTORS
HOLGER NIEL JAGER
WALTER NEEDRE
DONALD E. GILLIS
THOMAS M. N. WOOD
BY William R Jacox
ATTORNEY 3,164,304
Patented Jan. 5, 1965

3,164,304

LIQUID DISPENSING APPARATUS FOR SMALL QUANTITIES

Holger Niel Jager, Quincy, Walter Needre, Randolph, Donald E. Gillis, Hingham, and Thomas M. N. Wood, Foxboro, Mass., assignors to Standard-Thomson Corporation, Waltham, Mass., a corporation of Delaware Filed May 8, 1961, Ser. No. 108,559
6 Claims. (Cl. 222—192)

This invention relates to control apparatus. The invention relates more particularly to apparatus for controlling the dispensing of quantities of material. The invention relates still more particularly to liquid dispenser apparatus. However, the invention is not so limited.

An object of this invention is to provide dispenser apparatus which is capable of dispensing a very small quantity of material upon each operation thereof.

Another object of this invention is to provide such dispenser apparatus which is capable of transferring a small quantity of liquid accurately and dependably from a liquid container to a work-piece.

Another object of this invention is to provide such dispenser apparatus which is capable of transferring a small quantity of liquid upon each operation thereof from one container to another container.

Another object of this invention is to provide such apparatus which may be automatically operated and which may be used in production line activity without the necessity of manual operation.

Another object of this invention is to provide such dispenser apparatus which may be built at relatively low cost and which is dependable and long-lived.

Other objects and advantages reside in the construction of parts, the combination thereof, the method of manufacture, and the mode of operation, as will become more apparent from the following description.

In the drawing:

FIGURE 1 is a front elevational view, with parts broken away and shown in section, of dispenser apparatus of this invention.

FIGURE 2 is an enlarged fragmentary view, with parts broken away and shown in section, of a portion of the apparatus shown in FIGURE 1, with elements of the apparatus shown in a position of operation.

FIGURE 3 is an enlarged fragmentary view, similar to FIGURE 2, showing elements of the apparatus in another position of operation.

FIGURE 4 is an enlarged fragmentary view, similar to FIGURES 2 and 3, showing elements of the apparatus during transfer of a quantity of liquid to a work-piece.

FIGURE 5 is an enlarged fragmentary view, with parts broken away and shown in section, of some of the elements illustrated in FIGURE 4, showing the position of separate small quantities of liquid following the transfer depicted in FIGURE 4.

FIGURE 6 is an enlarged fragmentary view, with elements of the apparatus broken away and in section, illustrating another method of operation of the apparatus in transferring a quantity of liquid.

FIGURE 7 is an enlarged fragmentary sectional view, similar to FIGURE 6, showing another step in such operation of the apparatus.

FIGURE 8 is an enlarged view taken substantially on line 8—8 of FIGURE 7.

FIGURE 9 is a sectional view illustrating a modification of the apparatus of this invention.

FIGURE 10 is a sectional view, similar to FIGURE 9, showing elements of the modification during operation thereof.

Referring to the drawings in detail, FIGURE 1 shows generally dispenser apparatus of this invention. The apparatus is illustrated as comprising any suitable support member 16 upon which is mounted a container 18. The container 18 has an opening at the lower end thereof through which a rod or plunger 20 extends. A bearing member 22 encompasses the rod 20. The bearing 22 is carried by a sleeve 23 within the opening of the container 18. A guide bearing 24, in spaced relation from the bearing 22, also encompasses the rod 20 to guide axial movement thereof. The bearing 24 is supported by any suitable structure 28.

The rod or plunger 20 is attached to an actuator 32 by means of a suitable connector 34. The connector 34 has a compression spring 35 therein which is in engagement with a head 37 of the plunger 20. The purpose of the spring 35 is discussed below.

The actuator 32 may be of any suitable electrical, manual, fluid, or mechanical type but is herein shown as being an electromagnetic device having a reciprocally movable armature 36 to which the connector 34 is attached. A core 38 is magnetized by a coil 40 to cause movement of the armature 36 toward the core 38. A tension spring 42 is shown connected to the armature 36 and urges the armature 36 in a direction away from the core 38.

A quantity of liquid 48 is retained within the container 18. Liquids such as solders, adhesives, lubricants, medicines and the like may be dispensed by the apparatus of this invention. The plunger 20 extends through the liquid 48. The plunger 20 is provided with a receptacle or carrier in the form of a notch 50. The notch 50 may be of any suitable shape or size. The plunger 20 is reciprocally movable from a position in which the notch 50 is, at least partially, disposed within the liquid 48, as shown in FIGURES 1 and 3, to a position in which the notch 50 is, at least partially, disposed beyond the bearing 22 and outside of the container 18, as shown in FIGURES 2 and 4. If desired, a turnbuckle 52 or the like, shown in FIGURE 1, may be connected in the plunger or rod 20, intermediate the ends thereof, to adjust the position of the notch 50 with respect to the container 18.

The lower end of the rod or plunger 20 may have any desired shape or size and is herein shown as being provided with a tapered portion 60 leading to a series of knobs 62, the knobs 62 being separated by annular slits or grooves 64. Preferably, the upper surface of each of the knobs 62 slopes slightly downwardly toward the center thereof.

*Operation*

As shown in the drawings, the apparatus of this invention may be used to dispense material, such as the liquid 48. The liquid 48 is dispensed in a small quantity upon each operation of the apparatus. Ordinarily, this apparatus is used to dispense a drop or a few drops of liquid upon each operation thereof. The liquid 48 may be transmitted to any element, as desired. For example, the liquid 48 may be transmitted to a work-piece 66, shown in FIGURES 4 and 5.

If it is desired to place a small quantity of the liquid 48 upon the work-piece 66, the work-piece 66 is disposed adjacent the end of the rod or plunger 20 and in alignment therewith. In the transfer of some types of liquids to elements or work-pieces 66, it is desirable that the rod 20 engage the work-piece 66.

As shown in FIGURE 1, the spring 42 causes the rod 20 to be normally disposed so that the notch 50 is, at least partially, positioned within the liquid 48. Thus, the notch 50 is normally filled with liquid 48. Electrical energization of the coil 40 causes the armature 36 to move the plunger 20 downwardly. Thus, the notch 50 is moved downwardly through the bearing 22 to a position in which the notch 50 is, at least partially, disposed below the bearing 22, as shown in FIGURE 2. Thus, the small quantity of liquid 48 carried by the notch 50, is transferred out of the container 18 and flows from the notch 50 downwardly along the rod or plunger 20, as shown in FIGURE 2.

After the coil 40 is deenergized, the spring 42 moves the plunger 20 upwardly so that the notch 50 is again in its normal position, as shown in FIGURE 3. The liquid 48 which is carried by the notch 50 to the position shown in FIGURE 2 continues to flow downwardly upon the rod 20 and collects about the knobs 62 and within the cuts or slits 64, as shown in FIGURE 3.

As stated above, the work-piece 66 may be positioned so that it can be engaged by the lower end of the rod 20. Therefore, upon the next downward movement of the rod 20, the end thereof engages the work-piece 66, and liquid 48 is transferred from the knobs 62 and from the slits 64 to the work-piece 66, as shown in FIGURE 4.

As the rod 20 engages the work-piece 66, the spring 35 within the connector 34 aids in absorbing any shock upon the rod 20 and permits movement of the rod 20 toward the actuator 32, if necessary.

During this downward movement of the rod 20, another small quantity of liquid 48 is carried by the notch 50 from the container 18 and moves downwardly along the rod 20, toward the knobs 62, as shown in FIGURE 4. Thus, as the rod 20 returns to its normal position, as shown in FIGURE 5, another small quantity of liquid 48 flows from the notch 50, as shown in FIGURE 4, to the knobs 62, as shown in FIGURE 5. Thus, during each operation of the apparatus a quantity of liquid 48 which is dispensed from the knobs 62 is replaced by another quantity of liquid flowing from the notch 50 to the knobs 62.

The small quantity of liquid 48 dispensed by the apparatus and transferred to the work-piece 66 as shown in FIGURE 4, remains on the work-piece 66, as shown in FIGURE 5, and may serve any purpose for which it is intended. For example, the liquid 48 may be a solder or adhesive material which solidifies over a given period of time to attach together two portions of the work-piece 66. Also, as stated above, the liquid 48 may be any other material such as a lubricant or the like which is applied in small quantities to a work element.

It is to be understood that the apparatus operates satisfactorily with the rod or plunger 20 at angles other than vertical. All that is necessary is that liquid travel downwardly along the rod or plunger 20.

*FIGURES 6 and 7*

FIGURES 6 and 7 illustrate another method of using this invention in the dispensing of liquid. FIGURES 6 and 7 illustrate transfer of liquid to an element without engagement of the plunger or rod 20 with the element which receives the liquid. Herein a liquid 68 is transferred in drops or small quantities to a container or receiver such as a bottle 69. After each operation of the rod 20, a quantity of liquid 68 is disposed upon the knobs 62 and within the slits 64, as discussed above.

Thus, when the rod 20 moves downwardly, it carries a quantity of liquid 68 upon the knobs 62, as shown in FIGURE 6. Also, when the rod or plunger 20 is moved downwardly, liquid 68 flows from the notch 50 downwardly along the rod 20, as shown in FIGURE 6.

By providing rapid downward movement of the plunger 20 followed by proper abrupt stopping and return action thereof the liquid 68 which is carried by the knobs 62 and the slits 64 is thrown or ejected therefrom, as shown in FIGURE 7. Thus, the liquid 68 is discharged into the container 69. The apparatus of this invention may thus be used to accurately provide a given quantity of liquid to a bottle or the like.

*FIGURES 9 and 10*

FIGURES 9 and 10 show a modification in the apparatus of this invention in which a container 70 carries a supply of liquid 72. A plunger or rod 74 has a notch 76 therein. Suitable actuator means axially move the rod 74 so that liquid is carried by the notch 76 into a well 78. The well 78 has a recess 82. As the rod 74 moves the notch 76 into the well 78, an end portion 80 of the rod 74 moves into the recess 82 and forces a quantity of liquid from the well 78. The liquid 72 is forced to pass a check valve 84 which is carried by a compression spring 86. The liquid 72 is thus forced into a tube or conduit 88, as shown in FIGURE 10. The tube or conduit 88 may be of any length to dispense the liquid in quantities determined by the volume displaced by the end portion 80 within the recess 82. As the rod 74 moves downwardly, additional liquid 72 is carried into the well 78 by the notch 76, as shown in FIGURE 10.

This apparatus is particularly useful in the dispensing of liquids which have certain flow and/or solidification characteristics. The well 78 retains only a limited quantity of liquid at any given time so that the liquid in the container 70 may be larger in volume and may be particularly maintained under desired conditions.

Thus, the apparatus of this invention is capable of accurately and consistently dispensing small metered quantities of materials. The materials dispensed may be directly applied by contact of the apparatus with another element or may be ejected from the apparatus to another element.

It is to be understood that actuator means of apparatus of this invention may be automatically controlled for dispensing material without manual operation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. Liquid dispenser apparatus for applying a small quantity such as a drop or so of liquid solder or the like to a work-piece comprising:

a container having an opening therein, a reciprocally axially movable rod slidably disposed within said opening, the rod being substantially vertically disposed, the rod having a recess therein, the rod being movable to position the recess within the container, the rod being movable to position the recess outside of the container, the rod having a lower end portion exterior of the container, the end portion being provided with a plurality of annular peripheral grooves, the lower end portion of the rod being in spaced relation from the recess, the rod having a lower end surface which is engageable with a work-piece, a small quantity of liquid being disposed in the recess within the container and moved from the container when the rod is moved downwardly to move the recess to a position outside the container, the small quantity of liquid flowing downwardly upon the rod and being retained by the lower end portion until the lower end surface is moved into engagement with a work-piece to permit the small quantity of liquid to flow from the end portion of the rod to the work-piece.

2. Liquid applicator apparatus for applying a small quantity of liquid material such as a drop or so of liquid material to a work-piece comprising:

a container having a bottom wall provided with an opening therethrough, a substantially vertical rod extending through the opening and slidably axially movable therein, the rod having a notch portion therein, the notch portion being movable through the opening for removing a small quantity of liquid from the container, the rod having a lower end portion exterior of the container for receiving and retaining the small quantity of liquid removed from the container by the notch portion, the lower end portion consisting of a plurality of axially vertically aligned knobs, the knobs being separated by annular peripheral grooves, the rod having a tapered portion directly above the knobs, the lowermost knob having a bottom surface engageable with a work-piece when the rod is moved downwardly, a small quantity of liquid being carried in the notch from the container as the notch is moved from the container, after the notch is moved from the container the small quantity of liquid flowing downwardly from the notch and upon the rod over the tapered portion, the small quantity of liquid flowing to the lower end portion and being retained by the knobs of the lower end portion of the rod until the bottom surface of the lowermost knob engages a work-piece, permitting liquid to flow directly from the knobs to the work-piece.

3. Liquid dispenser apparatus for applying a small quantity of liquid such as a drop or so of liquid to a work-piece comprising:

a container having a bottom wall provided with an opening therethrough, a vertical rod extending through the opening and slidably axially movable therein, the rod having a recess portion therein which is disposable within the container, the recess portion being movable from the container through the opening for removing a small quantity of liquid from the container as the liquid is carried in the recess portion, the rod having a lower end portion exterior of the container, the lower end portion being provided with a plurality of juxtaposed axially vertically aligned knobs, the knobs being coaxial with the rod, each of the axially aligned knobs having an upper surface which slopes toward the center thereof, the lower end portion retaining a small quantity of liquid which moves thereto upon the rod from the recess portion after the recess portion is moved from the container, the small quantity of liquid being retained as a drop upon the lower end portion of the rod, the lower end portion releasing the small quantity of liquid therefrom as the lower end portion of the rod moves into engagement with a work-piece so that the small quantity of liquid flows directly from the lower end portion to the work-piece.

4. Apparatus for applying a small quantity of liquid such as a drop or so of liquid to a work-piece comprising:

a container provided with a bottom enclosing wall, a vertically disposed reciprocally operable plunger extending through the enclosing wall, the plunger having a carrier portion disposable within the container and movable from the container through the enclosing wall to carry a small quantity of liquid from the container, the plunger having a transfer portion at the lower end thereof and disposed outside of the container, the transfer portion being provided with a plurality of annular peripheral grooves, the transfer portion of the plunger being engageable with a work-piece by downward movement of the plunger, the transfer portion having an engagement surface at the lower end thereof, the engagement surface being engageable with a work-piece, the plunger having a support portion intermediate the carrier portion and the transfer portion, a small quantity of liquid such as a drop or so of liquid being carried from the container by the carrier portion as the plunger moves to position the carrier portion outside of the container, the small quantity of liquid flowing downwardly upon the support portion from the carrier portion to the transfer portion after the carrier portion is moved from the container, the transfer portion retaining the small quantity of liquid until the engagement surface of the transfer portion engages the work-piece permitting the small quantity of liquid to flow directly from the transfer portion to the work-piece.

5. Apparatus for applying a small quantity such as a drop or so of liquid solder or the like to a work-piece comprising:

a liquid container provided with a bottom wall having an opening therethrough, a vertically disposed rod extending through the opening, the rod being reciprocally axially movable with respect to the wall, the rod being provided with a recess portion therein, the recess portion being movable from the upper side of the bottom wall to the lower side of the bottom wall by axial movement of the rod, the recess portion being outside the container when disposed at the lower side of the bottom wall, the rod having a lower end portion provided with a plurality of juxtaposed axially aligned knobs, each of the knobs having an upper surface which slopes inwardly toward the central axis thereof and downwardly, the lowermost knob having a lower engagement surface at the bottom thereof for engagement with a work-piece, the recess portion being small so that only a small quantity of liquid such as a drop or so of liquid flows into the recess portion of the rod when the recess portion is above the bottom wall and within the container, the small quantity of liquid flowing downwardly from the recess portion when the rod moves downwardly and after the recess portion is disposed below the bottom wall, the small quantity of liquid flowing downwardly from the recess portion and engaging the knobs including the upper surfaces thereof, the small quantity of liquid forming a drop or so of liquid upon the lower end portion of the rod, the small quantity of liquid being retained by the lower end portion of the rod until the rod is moved downwardly and engages a work-piece, engagement of the lower end portion of the rod with the work-piece permitting the small quantity of liquid to flow from the lower end portion of the rod to the work-piece.

6. Apparatus for applying a small quantity such as a drop or so of liquid material to a work-piece comprising:

a container having a bottom wall provided with an opening therethrough, a rod extending vertically through the opening and axially movable with respect to the bottom wall of the container, the rod having a recess portion therein, the recess portion being movable from one side of the bottom wall to the other side of the bottom wall with axial movement of the rod, the rod having a lower end portion, the lower end portion being provided with an annular groove which is transverse to the longitudinal axis of the rod, the rod having an engagement surface at the lower end thereof engageable with a work-piece when the rod is moved downwardly, a small quantity of the liquid material in the container being disposed within the recess of the rod when the recess is disposed within the container and above the bottom wall, the liquid material flowing downwardly upon the surface of the rod as the rod is moved so that the recess is outside of the container, the liquid material flowing downwardly and engaging the lower end portion and flowing into the annular groove of the lower end portion of the rod, the small quantity of the liquid material being thus retained as a drop or the like by the lower end portion of the rod until the rod is moved downwardly causing the engagement surface to engage a work-piece so that the small quantity of the liquid material flows directly from the lower portion of the rod to the work-piece.

References Cited in the file of this patent

UNITED STATES PATENTS

| | | |
|---|---|---|
| 1,547,953 | Palmer | July 28, 1925 |
| 2,654,459 | Connolly | Oct. 6, 1953 |
| 2,709,538 | Harrington | May 31, 1955 |
| 2,894,665 | Zerlin | July 14, 1959 |

FOREIGN PATENTS

| | | |
|---|---|---|
| 2,209 of 1913 | Great Britain | Jan. 27, 1913 |
| 1,118,478 | France | Mar. 19, 1956 |